(12) United States Patent
Prescott

(10) Patent No.: US 8,691,091 B2
(45) Date of Patent: Apr. 8, 2014

(54) AERATION CONTROL VALVE SYSTEM FOR WATER TREATMENT SYSTEM AND METHODS FOR USING SAME

(75) Inventor: Russell E. Prescott, Kingston, NH (US)

(73) Assignee: R.E. Prescott Co., Inc., Exeter, NH (US)

( * ) Notice: Subject to any disclaimer, the term of this patent is extended or adjusted under 35 U.S.C. 154(b) by 718 days.

(21) Appl. No.: 12/912,074

(22) Filed: Oct. 26, 2010

(65) Prior Publication Data

US 2012/0097618 A1  Apr. 26, 2012

(51) Int. Cl.
 *B01D 24/46* (2006.01)
 *C02F 1/42* (2006.01)
 *C02F 1/74* (2006.01)
 *F16K 11/065* (2006.01)

(52) U.S. Cl.
USPC ...... 210/278; 210/758; 210/794; 137/565.01; 137/625.67

(58) Field of Classification Search
CPC .. C02F 1/74; C02F 2303/16; C02F 2101/203; C02F 2101/206; C02F 1/001; C02F 1/64; C02F 1/645; C02F 5/00; C02F 1/006; C02F 1/72; C02F 1/727; C02F 2101/101; C02F 2101/103; C02F 2201/005; F16K 11/0712; F16K 11/065; F16K 11/0715; B01D 2313/18
USPC ............ 137/206, 583, 587, 588, 625, 625.11, 137/625.12, 625.18, 625.2, 625.25, 625.48, 137/625.49, 625.67, 565.01, 597, 625.68; 210/139, 409, 411, 435, 436, 481, 660, 210/661, 673, 681, 278, 794, 138, 145, 190, 210/191, 263, 269, 275, 277, 288, 424, 472, 210/670, 678, 687, 702, 721, 722, 758, 771, 210/791, 792, 807, 418; 239/407, 414, 549, 239/421
See application file for complete search history.

(56) References Cited

U.S. PATENT DOCUMENTS

| | | | |
|---|---|---|---|
| 3,151,064 A | 9/1964 | Lathrop | |
| 5,096,596 A | 3/1992 | Hellenbrand et al. | |
| 5,628,899 A | 5/1997 | Vaughan | |
| 5,919,373 A * | 7/1999 | Naaktgeboren | 210/750 |
| 6,402,944 B1 | 6/2002 | Vaughan | |
| 7,300,569 B2 * | 11/2007 | Petty | 210/138 |
| 7,488,424 B2 | 2/2009 | Gruett et al. | |
| 7,491,321 B1 * | 2/2009 | Maas et al. | 210/136 |
| 7,563,361 B2 | 7/2009 | Gruett et al. | |
| 7,638,063 B1 | 12/2009 | Maas et al. | |
| 7,722,760 B2 * | 5/2010 | Griesbach | 210/108 |

* cited by examiner

*Primary Examiner* — Bobby Ramdhanie
*Assistant Examiner* — Patrick Orme
(74) *Attorney, Agent, or Firm* — Grossman Tucker Perreault & Pfleger, PLLC

(57) ABSTRACT

An aeration control valve system may be used with a water treatment system to control aeration and flow of water in accordance with various operating cycles. The aeration control valve system pumps air into the water treatment system to provide an air charge for aerating the water to facilitate water treatment. The aeration control valve system may pump air into the water treatment system at atmospheric pressure or may pump air at higher pressures such that the air may be recharged while also treating the water. The aeration control valve may also control the release of air from the water treatment system. The operating cycles may include, for example, a service cycle, a backwash cycle, an air regeneration cycle, a service/air charge cycle, an air release cycle, and a rinse cycle.

27 Claims, 11 Drawing Sheets

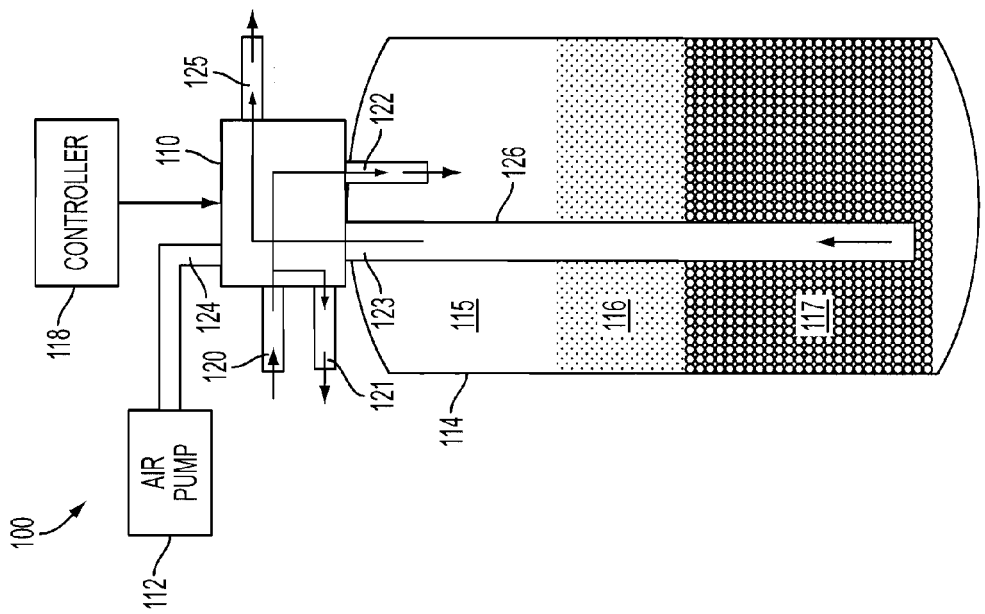
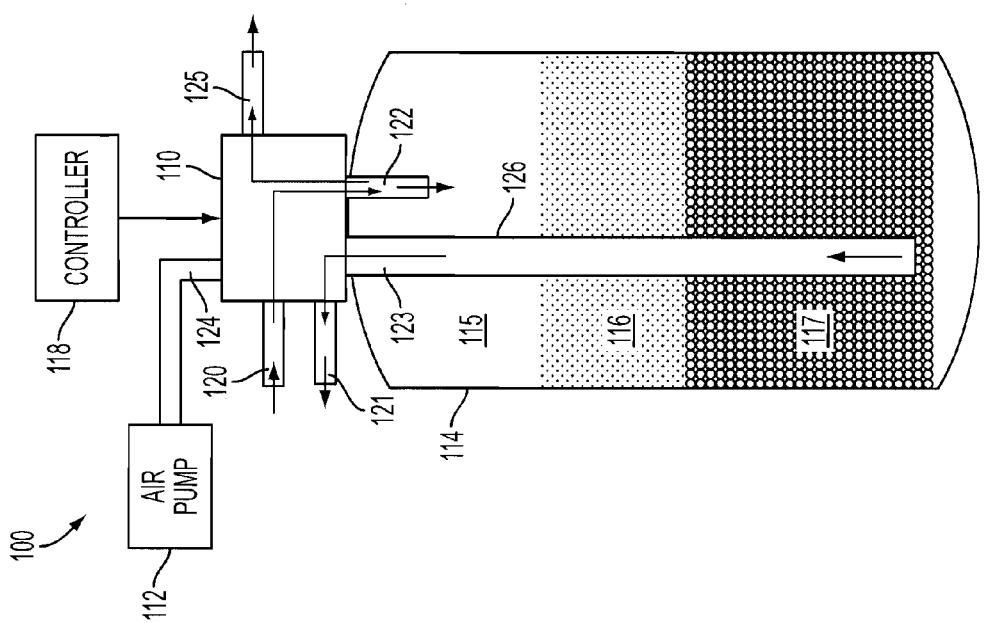

AERATION CONTROL VALVE SYSTEM FOR WATER TREATMENT SYSTEM AND METHODS FOR USING SAME

TECHNICAL FIELD

The present invention relates to water treatment systems and more particularly, to an aeration control valve system for controlling water flow through and aeration in a water treatment system.

BACKGROUND INFORMATION

Water treatment systems are commonly used in water supply systems. In a residential water supply system, for example, water softeners, acid neutralizers, iron/manganese removal systems, arsenic removal systems, and aeration systems may be used to filter or treat the water being supplied from a water source (e.g., from a well or city water supply). To facilitate the removal of contaminants, such as iron, manganese, and sulfur, some water treatment systems aerate the water to provide oxidation prior to the filtering. In such systems, a head of air may be maintained at the top of a water treatment tank such that the water provided to the tank passes through the head of air before passing through filter media.

Some existing water treatment systems include a control valve (e.g., connected to the top of the tank) to control the water passing in to and out of the system according to water treatment operating cycles. To provide the head of air in an existing water treatment system that uses aeration, the control valve may perform an air draw cycle by directing water through a venturi coupled to an air inlet such that the venturi draws air into the top of the filter tank with the water directed to the top of the tank while also directing water from the bottom of the tank to a drain. During a service cycle, the control valve directs the water to flow through the trapped air in the tank, through filter media in the tank, and then to a service water system (e.g., a residential water system). To provide air regeneration in these existing water treatment systems, a control valve first initiates a backwash cycle that opens a drain line to release or discharge the old compressed air in the tank while directing water to the bottom of the filter tank to backwash the filter media.

The use of these existing water treatment systems with a venturi providing aeration presents several drawbacks. One such drawback is the noise and rattling of the drain line when the compressed air charge is released suddenly during the backwash cycle. If the drain line is not properly secured, this may also cause unwanted splashing, breaks and/or flooding. The rapid air escape may also cause the filter media to jump vertically inside the filter tank, causing it to be lost through the drain line and possibly causing plugging of the drain and flooding. To avoid this, existing systems often use less filter media and approximately 25% of the filter bed depth may be lost, requiring more frequent air regenerations, wasted water and wasted electricity. Using a larger tank results in more water going to drain during an air draw cycle and an increased cost of the filter media.

Another drawback of the existing water treatment systems using a venturi to provide aeration is the wasted water that must pass through the venturi to introduce sufficient air into the filter tank. In a residential system that regenerates every night and takes 1 gallon of water to introduce 1.75 gallons of air, for example, over 2,500 gallons of water per year may be lost or the equivalent of 100 ten minute showers per year. The use of untreated water through the venturi to provide the aeration may also cause the venturi to become clogged with iron and stop drawing air, which may cause the filter to bleed contaminants into the residential water supply.

A further drawback of the existing systems using a venturi to provide aeration is the need for a complete air regeneration cycle (e.g., a backwash cycle before an air draw cycle) to provide a new charge of air. Thus, these existing systems may not be recharged with air while remaining in service.

BRIEF DESCRIPTION OF THE DRAWINGS

These and other features and advantages will be better understood by reading the following detailed description, taken together with the drawings wherein:

FIG. 2E is a schematic view of the water treatment system in FIG. 1 illustrating flow through the aeration control valve system during an air release cycle.

FIG. 2F is a schematic view of the water treatment system in FIG. 1 illustrating flow through the aeration control valve system during a rinse cycle.

DETAILED DESCRIPTION

An aeration control valve system, consistent with embodiments of the present invention, may be used with a water treatment system to control aeration and flow of water in accordance with various operating cycles. The aeration control valve system pumps air into the water treatment system to provide an air charge for aerating the water to facilitate water treatment. The aeration control valve system may pump air into the water treatment system at atmospheric pressure or may pump air at higher pressures such that the air may be recharged while also treating the water. The aeration control valve may also control the release of air from the water treatment system. The operating cycles may include, for example, a service cycle, a backwash cycle, an air regeneration cycle, a service/air charge cycle, an air release cycle, and a rinse cycle.

As used herein, "fluid connection" refers to a connection between elements that allows fluid to flow between the elements and "fluidly couple" refers to providing a fluid connection between the elements. The terms "couple" and "connection" are not limited to a direct mechanical connection and may include an indirect mechanical connection that is made through other components or structures.

Figure 1:
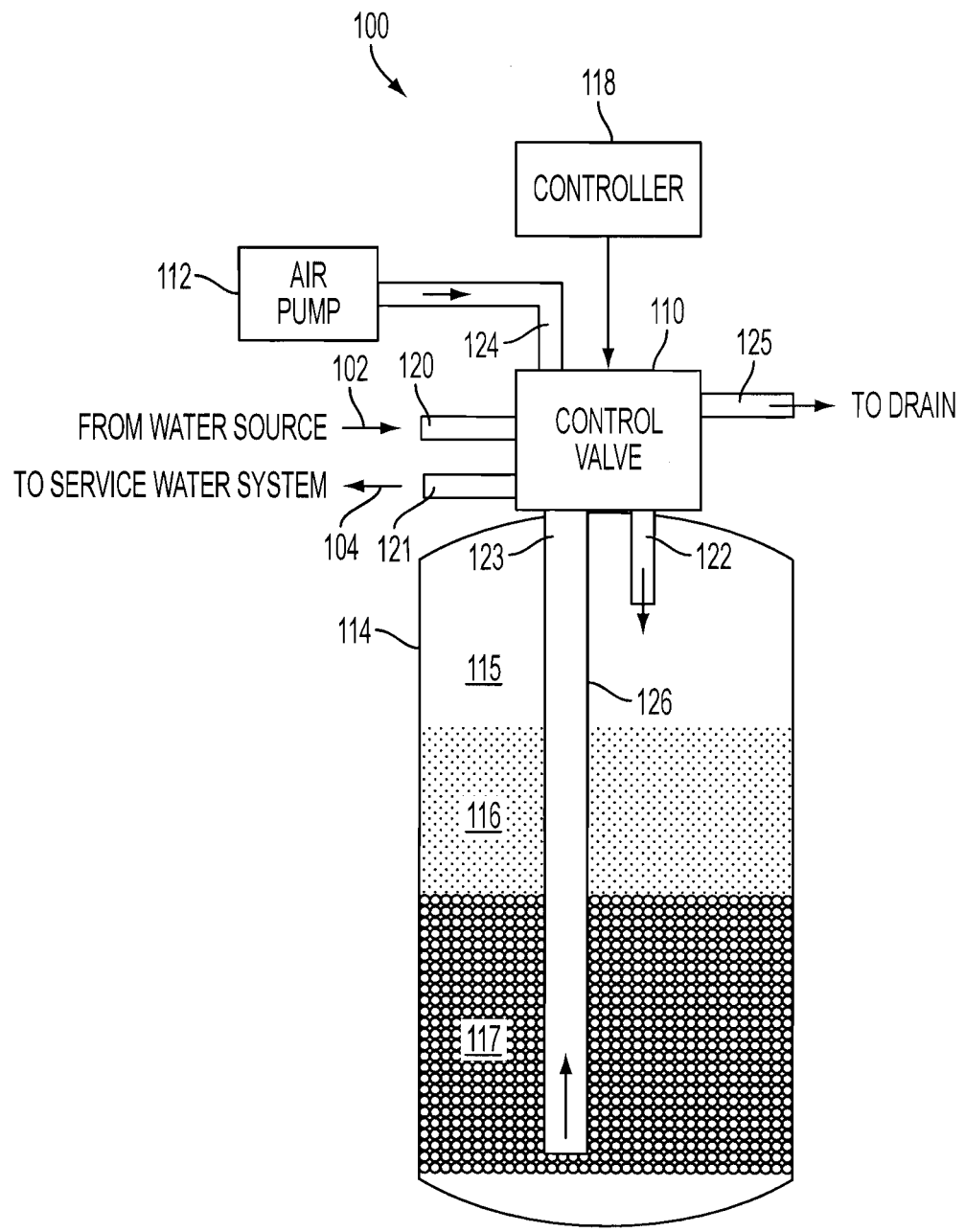
FIG. 1 is a schematic view of a water treatment system including an aeration control valve system, consistent with embodiments of the present invention.

Referring to FIG. 1, a water treatment system 100, consistent with an embodiment, includes an aeration control valve 110 fluidly coupled to an air pump 112, a water treatment tank 114, and various inlets and outlets. The aeration control valve 110 controls the flow of air and water in to and out of the water treatment tank 114, and the air pump 112 pumps air into the tank 114 to provide aeration. The water treatment tank 114 may contain an air charge 115, aerated water 116 to be treated, and filter media 117 for filtering the aerated water 116. To provide water treatment, the water treatment system 100 directs water from a supply line 102 through the water treatment tank 114 to a delivery line 104. The supply line 102 may supply water from a water source such as a well or city water supply. The delivery line 104 may provide water to a service water system in a building, such as a residential home. The water treatment system 100 may be coupled, for example, to a residential water supply system at the point of entry. The water treatment system 100 may also be configured for use in a commercial water supply system.

The water treatment system 100 aerates the water 116 as it passes through the air charge 115 in the water treatment tank 114 and then filters the aerated water 116 as it passes through filter media 117. In one example, iron, manganese and hydrogen sulfide gas dissolved in the water 116 is oxidized when exposed to the air charge 115 and becomes a solid precipitate that can be trapped in the filter media 117. The filter media 117 includes any type of filter media capable of trapping the contaminants to be removed. The aeration control valve 110 may be used with various types and configurations of water treatment systems.

The control valve 110 may include a supply water inlet passage 120, a service water outlet passage 121, first and second tank passages 122, 123, an air inlet passage 124, and a drain outlet passage 125. The supply water inlet passage 120 may be fluidly coupled to the supply line 102 and the service water outlet passage 121 may be fluidly coupled to the delivery line 104. The first and second tank passages 122, 123 are coupled to the water treatment tank 114 for passing water in to and out of the tank 114. In one embodiment, the second tank passage 123 is coupled to a conduit 126 that extends into the filter media 117 proximate the bottom region of the water treatment tank 114. The air inlet passage 124 is coupled to the air pump 112 for directing the pumped air into the tank 114. The drain outlet passage 125 may be coupled to a drain for directing water from the tank 114 to the drain.

The control valve 110 may also include a valve cycle actuator (not shown) that provides fluid connections between the passages 120-125 based on different positions of the valve cycle actuator. The control valve 110 controls the flow of water and/or air between the passages 120-125 and in to and out of the water treatment tank 114, for example, according to the various water treatment cycles or operations. In a water softener, for example, a control valve assembly may provide different positions (e.g., a service position, a backwash position, an air charge or regeneration position, an air release position, and a rinse position) allowing water and/or air to flow according to different water softener treatment cycles.

As will be described in greater detail below, the aeration control valve 110 may be based on an existing control valve such as the WS Series of control valves available from Clack Corporation. In one embodiment, the air pump 112 coupled to the aeration control valve 110 may be an atmospheric air pump capable of providing air pressures in a range of about 5 to 25 psi. In another embodiment, the air pump 112 coupled to the aeration control valve 110 may be a high pressure air pump capable of providing air pressures greater than about 25 psi. An aeration control valve system including a high pressure air pump is capable of providing a service/air charge cycle in which the water treatment system 100 regenerates an air charge in the water treatment tank 114 while also treating the water.

The control valve 110 may include user controls on a side thereof to allow the user to control valve functionality such as when certain treatment cycles or operations occur (e.g., based on a time of day or number of days or number of gallons used). A controller 118 may also be coupled to the control valve 110 to control operation of the control valve 110 and initiation of the cycles of operation, for example, according to a programmed schedule. Other types of controls may also be provided.

Examples of water treatment systems include, but are not limited to, water softeners, acid neutralizers, iron/manganese removal systems, arsenic removal systems, other contaminant removal systems, and aeration systems. Water treatment systems may include tanks or other devices that store or allow water to pass through as part of a treatment process. The water treatment systems may also include redundant water treatment tanks (e.g., redundant arsenic removal systems) or may include different water treatment tanks (e.g., an acid neutralizer and a water softener). Water treatment systems may also include water heaters or other devices that alter the temperature or other conditions of the water.

FIGS. 2A-2F illustrate water and/or air flow through the aeration control valve 110 during different operating cycles of the water treatment system 100. Although certain operating cycles are illustrated and described herein, the water treatment system 100 and the aeration control valve 110 are not limited to these operating cycles and may be used with other operating cycles.

Figure 2A:
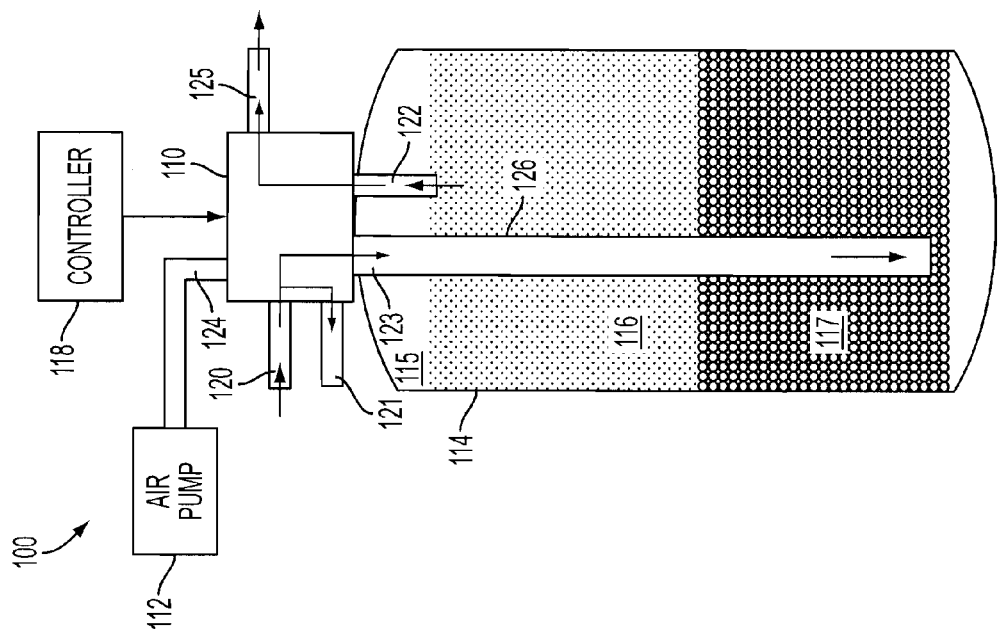
FIG. 2A is a schematic view of the water treatment system in FIG. 1 illustrating flow through the aeration control valve system during a service cycle.

FIG. 2A illustrates a service cycle during which the water treatment system 100 is "in service" treating water and directing the treated water to the service water system. During the service cycle in this embodiment, the aeration control valve 110 directs untreated water from the supply water inlet passage 120 to the first tank passage 122 and directs treated water from the second tank passage 123 to the service water outlet passage 121. The untreated water from the first tank passage 122 may be directed to the top region of the tank 114 such that the water passes through the charge of air 115. The treated water may be drawn from the bottom region of the tank (i.e., after passing through the filter media 117) through the conduit 126 coupled to the second tank passage 123. The aeration control valve 110 may also substantially prevent air 115 from escaping from the tank 114 during the service cycle, thereby maintaining the air charge for aeration during filtering.

Figure 2B:
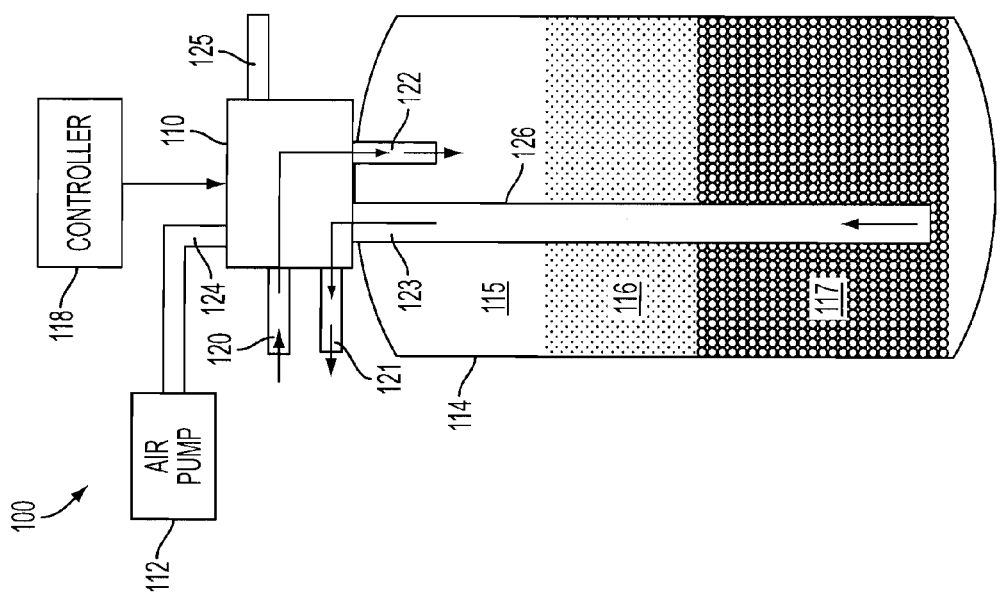
FIG. 2B is a schematic view of the water treatment system in FIG. 1 illustrating flow through the aeration control valve system during a backwash cycle.

FIG. 2B illustrates a backwash cycle during which the water treatment system 100 reverses the flow of water to clean or wash precipitates off the filter media 117. During the backwash cycle in this embodiment, the aeration control valve 110 directs untreated water from the supply water inlet passage 120 to the second tank passage 123 and directs the water in the tank 114 from the first tank passage 122 to the drain passage 125, thereby reversing the direction of flow through the tank 114. The water thus flows from the second tank passage 123, down the conduit 126, up through the filter media 117, and into the first tank passage 122. During the backwash cycle, the aeration control valve 110 may also direct a portion of the untreated water from the supply water inlet passage 120 to the service water outlet passage 121 such that water is supplied to the service water system during the backwash cycle.

Figure 2C:
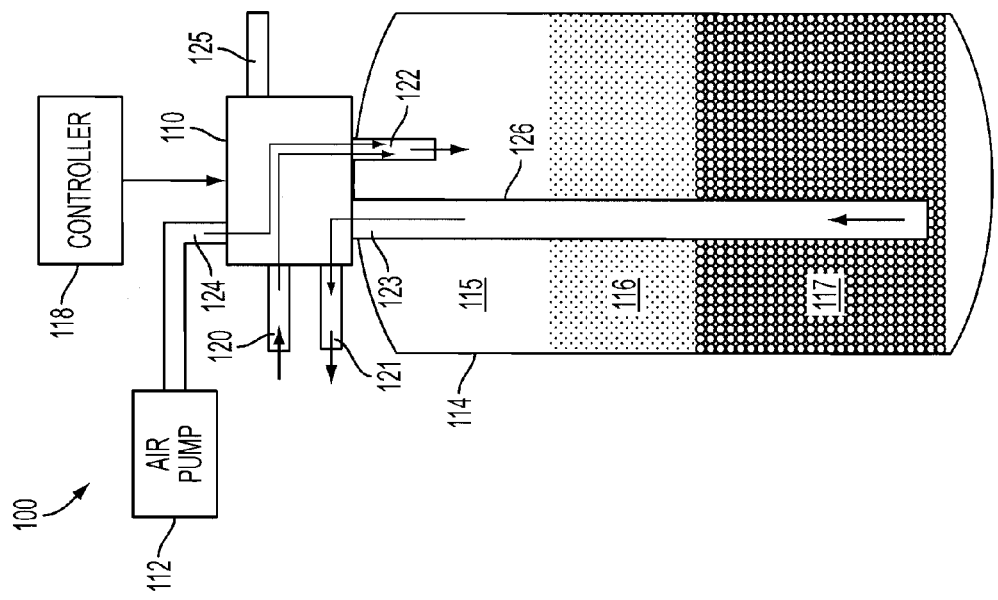
FIG. 2C is a schematic view of the water treatment system in FIG. 1 illustrating flow through the aeration control valve system during an air regeneration cycle.

FIG. 2C illustrates an air regeneration cycle during which the water treatment system 100 regenerates the air charge. During the air regeneration cycle in this embodiment, the aeration control valve 110 directs pumped air provided by the air pump 112 from the air passage 124 to the first tank passage 122 and directs water in the tank 114 from the second tank passage 123 to the drain passage 125. During the air regeneration cycle in this embodiment, the aeration control valve 110 also directs untreated water from the supply water inlet passage 120 to the service water outlet passage 121 such that water is supplied to the service water system during the air regeneration cycle. By pumping the air into the water treatment tank 114, the air regeneration may be accomplished without using water to draw air into the tank and thus without wasting water. An air regeneration cycle may be performed periodically, for example, at time intervals corresponding to when the oxidizing capacity of the air charge is consumed.

Figure 2D:
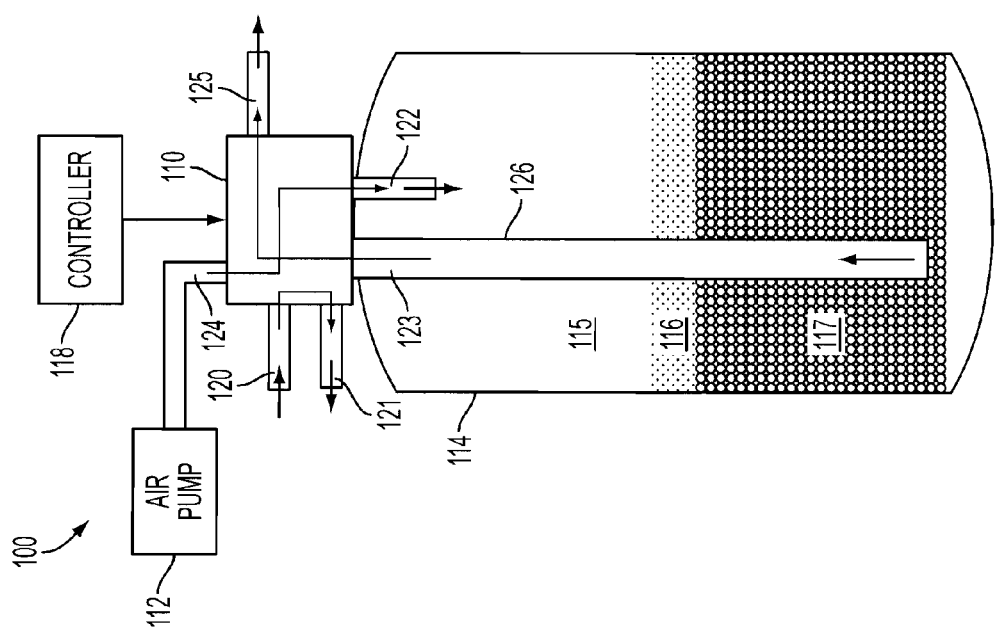
FIG. 2D is a schematic view of the water treatment system in FIG. 1 illustrating flow through the aeration control valve system during an air charge/service cycle.

FIG. 2D illustrates a service/air charge cycle during which the water treatment system 100 regenerates the air charge while the water is being treated. During the service/air charge cycle in this embodiment, the aeration control valve 110 directs untreated water from the supply water inlet passage 120 to the first tank passage 122 and directs treated water from the second tank passage 123 to the service water outlet passage 121 while also directing pumped air provided by the air pump 112 from the air passage 124 to the first tank passage 122. In this embodiment, the air may be pumped at a higher pressure (e.g., greater than 25 psi) to enable the air charge to be maintained during service and without using water to draw air into the tank. The service/air charge cycle, according to this embodiment, allows a new charge of air without performing a complete cycle (i.e., without a backwash cycle) and thus facilitates more frequent air charges.

FIG. 2E illustrates an air release cycle during which water treatment system 100 allows the release of air, for example, prior to a backwash cycle or prior to a service/air charge cycle. During the air release cycle in this embodiment, the aeration control valve 110 directs air 115 in the water treatment tank 114 to the drain passage 125. The air may be released relatively slowly (e.g., at a rate of 0.5 CFM or less) to prevent a sudden depressurization. By performing an air release cycle prior to a backwash cycle, the release of air may be controlled to prevent the air charge from rushing out to the drain during backwash, thereby preventing noise, rattling, flooding, and loss of filter media. During the air release cycle, the aeration control valve 110 also directs untreated water from the supply water inlet passage 120 to the first tank passage 122 and directs treated water from the second tank passage 123 to the service water outlet passage 121. Thus, the air release may occur while the water treatment system 100 is "in service" and treating water.

FIG. 2F illustrates a rinse cycle during which the water treatment system 100 causes water to flow through and rinse the filter media 117, for example, after a backwash. During the rinse cycle in this embodiment, the aeration control valve 110 directs untreated water from the supply water inlet passage 120 to the first tank passage 122 and directs water in the tank 114 from the second tank passage 123 to the drain passage 125. The aeration control valve 110 may also direct a portion of the untreated water from the supply water inlet passage 120 to the service water outlet passage 121 such that water is supplied to the service water system during the rinse cycle.

The operating cycles described above may be performed in different sequences. In one embodiment, the water treatment system 100 performs a backwash cycle (e.g., FIG. 2B) before an air regeneration cycle (e.g., FIG. 2C). In another embodiment, the water treatment system 100 may perform an air release cycle (e.g., FIG. 2E) followed by a backwash cycle (e.g., FIG. 2B) followed by a rinse cycle (e.g., FIG. 2F) and then followed by a service/air charge cycle (FIG. 2D). The controller 118 may be programmed to cause the aeration control valve 110 to perform a certain sequence of operating cycles at desired times. Other sequences and other operating cycles may also be performed by the aeration control valve 110.

Figure 3A:
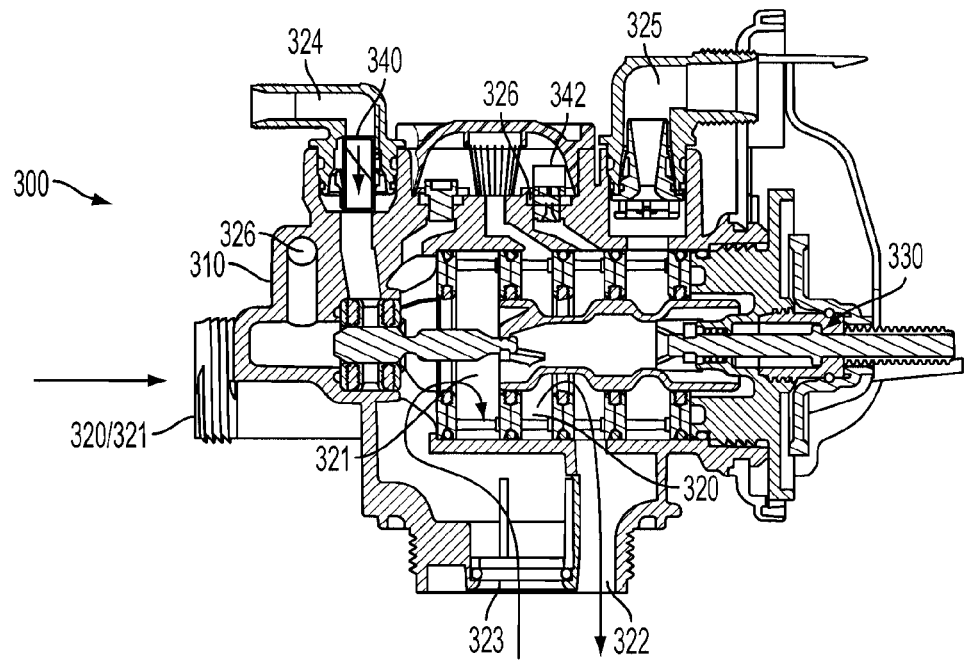
FIGS. 3A-3C are cross-sectional views of one embodiment of an aeration control valve during a service cycle, a backwash cycle, and an air regeneration cycle, respectively.
Figure 3B:
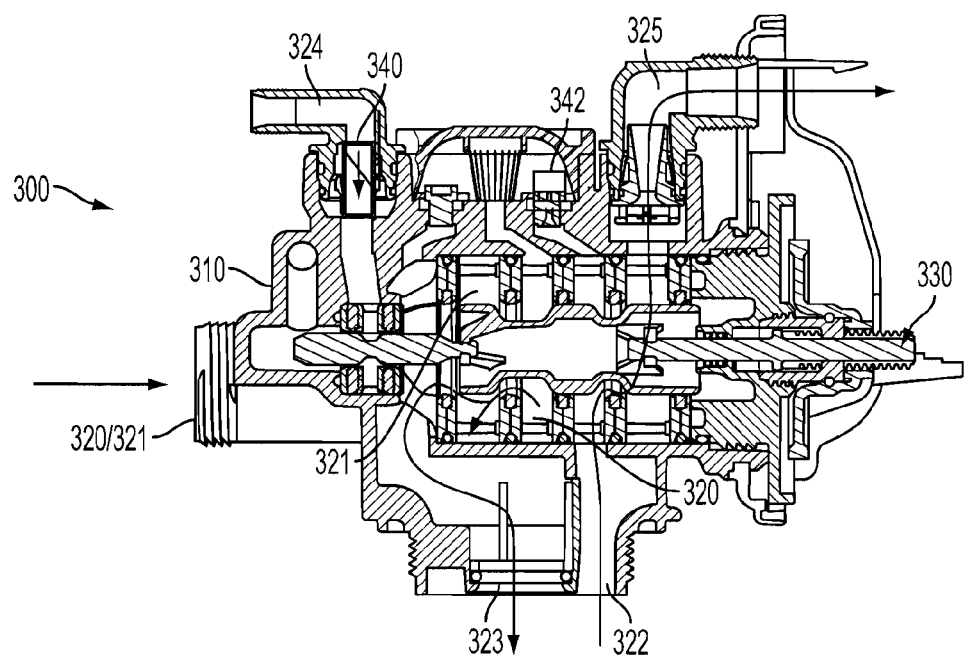
Figure 3C:
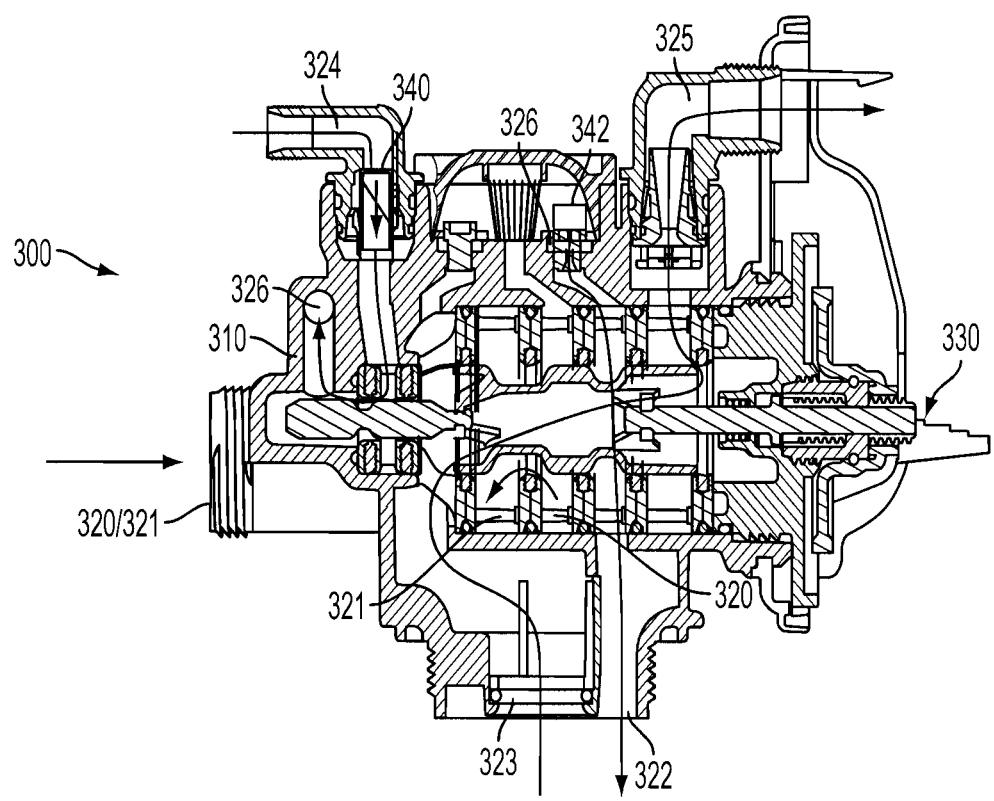

Referring to FIGS. 3A-3C, one embodiment of an aeration control valve 300 for use with atmospheric pressure aeration is described in detail. The aeration control valve 300 includes a valve body 310, a supply water inlet passage 320, a service water outlet passage 321, first and second tank passages 322, 323, an air passage 324 and a drain passage 325. According to this embodiment, a valve actuator piston 330 moves within the valve body 310 to provide a fluid connection between the passages 320-325. An atmospheric air pump (not shown) may be coupled to the air passage 324 to pump air into the air passage 324 and through an air manifold 326 in the control valve 300.

The aeration control valve 300 may be based on a WS Series control valve available from Clack Corporation with some modifications to allow air to be pumped through the valve body 310. The aeration control valve 300 may include, for example, a check valve 340 located in the air passage 324 such that air may be pumped through the check valve 340 into the control valve 300 without allowing air to pass out of the control valve 300 through the check valve 340. In one embodiment, the aeration control valve 300 may be a WS Series valve originally designed for venturi aeration but with a plug 342 plugging the injector used for the aeration. Because an air pump pumps the air into the air passage 324, the air may be forced through the air manifold 326 without using water to draw the air in through the venturi injector. Although the illustrated embodiment shows a variation of a WS Series control valve, an aeration control valve capable of providing the aeration and performing the operating cycles shown in FIGS. 3A-3C may also be based on other control valve designs.

During a service cycle, as shown in FIG. 3A, the valve actuator piston 330 is located at a position that blocks air from flowing into the air manifold 326, allows water to flow from the supply water inlet passage 320 to the first tank passage 322, and allows water to flow from the second tank passage 323 to the service water outlet passage 321. During a backwash cycle, as shown in FIG. 3B, the valve actuator piston 330 is located at a position that allows water to flow from the supply water inlet passage 320 into the service water outlet passage 321 and into the second tank passage 323 and allows water to flow from the first tank passage 322 to the drain passage 325. During an air regeneration cycle, as shown in FIG. 3C, the valve actuator piston 330 is located at a position that allows pumped air to flow from the air passage 324 through the air manifold 326 to the first tank passage 322, allows water to flow from the second tank passage 323 to the drain passage 325, and allows water to flow from the supply water inlet passage 320 to the service water outlet passage 321.

Referring to FIGS. 4A-4D, another embodiment of an aeration control valve 400 for use with high pressure aeration is described in detail. The aeration control valve 400 includes a valve body 410, a supply water inlet passage 420, a service water outlet passage 421, first and second tank passages 422, 423, an air passage 424 and a drain passage 425. According to this embodiment, a valve actuator piston 430 moves within the valve body 410 to provide a fluid connection between the passages 420-425. A high pressure air pump (not shown) is coupled to the air passage 424 to pump air at higher pressures (e.g., greater than 25 psi) into the air passage 424 and through an air manifold 426 in the control valve 400.

This embodiment of the aeration control valve 400 may also be based on a WS Series control valve available from Clack Corporation with some modifications to allow air to be pumped through the valve body 410. The aeration control valve 400 may include, for example, a check valve 440 located in the air passage 424 such that air may be pumped through the check valve 440 into the control valve 400 without allowing the air to pass out of the control valve 400 through the check valve 440. The aeration control valve 400 may be a WS Series valve originally designed for venturi aeration but with a plug 442 plugging the injector used for the aeration. Because an air pump pumps the air into the air passage 424, the air may be forced through the air manifold 426 without using water to draw the air in through the venturi injector.

In this embodiment, the valve actuator piston 430 may be modified such that the piston 430 does not extend into and block the pathway between the air inlet passage 424 and the air manifold 426. A piston plug 434 may be used to maintain an open pathway between the air inlet passage 424 and the air manifold 426 instead of allowing an end portion of the piston 430 to open and close the pathway. The valve actuator piston 430 may also have a notched portion 432 configured to allow air to pass from the first tank passage 422 to the drain passage 425 when located in a certain position, as will be described in greater detail below. Although the illustrated embodiment shows a variation of a WS Series control valve, an aeration control valve capable of providing high pressure aeration and performing the operating cycles shown in FIGS. 4A-4D may also be based on other control valve designs.

Figure 4A:
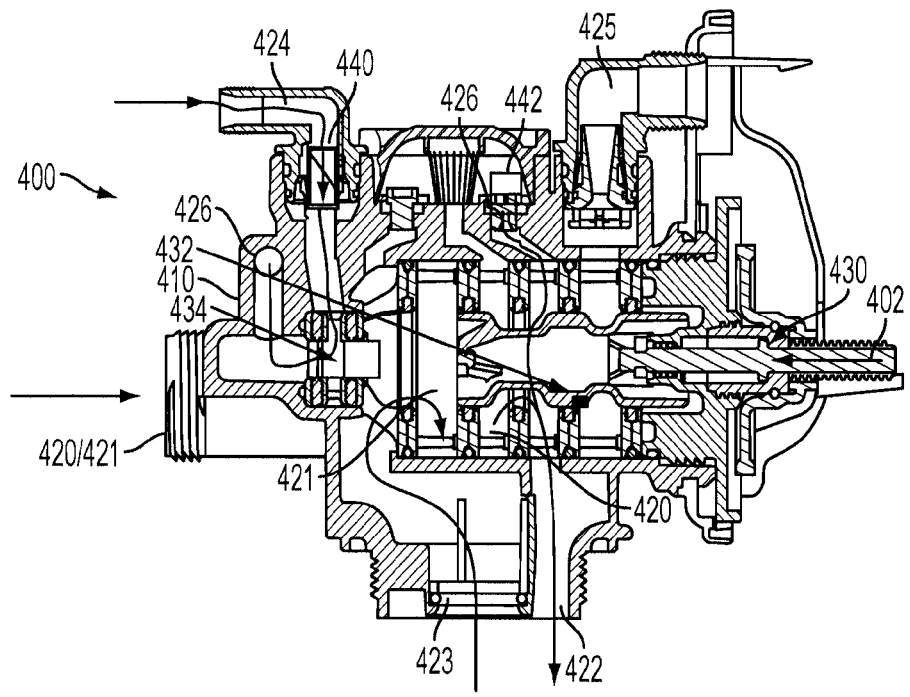
FIGS. 4A-4D are cross-sectional views of another embodiment of an aeration control valve during a service/air charge cycle, an air release cycle, a backwash cycle, and a rinse cycle, respectively.
Figure 4B:
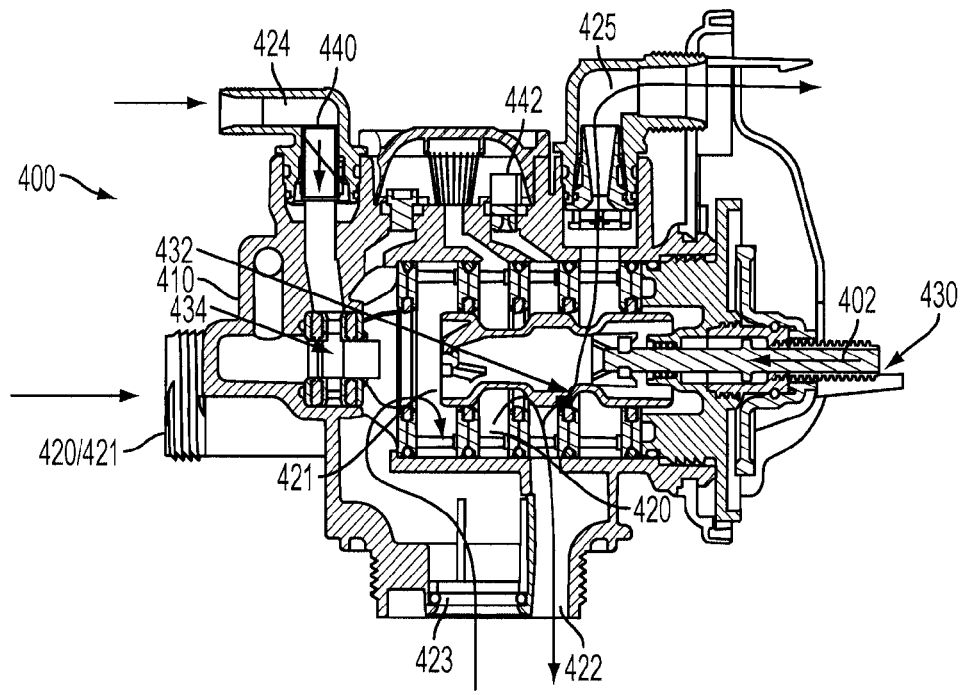

During a service/air charge cycle, as shown in FIG. 4A, the valve actuator piston 430 is located in a position that allows water to flow from the supply water inlet passage 420 to the first tank passage 422 and from the second tank passage 423 to the service water outlet passage 421 and that allows the high pressure pumped air to flow from the air manifold 426 to the first tank passage 422. During an air release cycle, as shown in FIG. 4B, the valve actuator piston 430 is located in a position that allows air to pass from the first tank passage 422 through the notched portion 432 in the valve actuator piston 430 to the drain passage 425 while also allowing water to flow from the supply water inlet passage 420 to the first tank passage 422 and from the second tank passage 423 to the service water outlet passage 421.

Figure 4C:
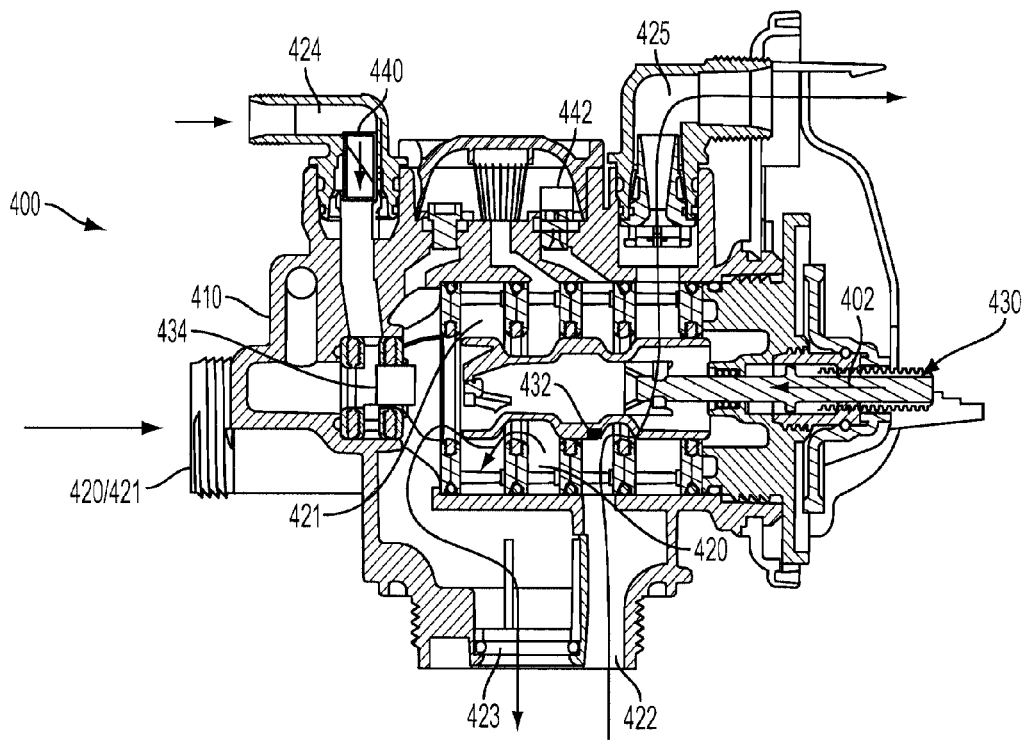

During a backwash cycle, as shown in FIG. 4C, the valve actuator piston 430 is located in a position that allows water to flow from the supply water inlet passage 420 into the service water outlet passage 421 and into the second tank passage 423 and allows water to flow from the first tank passage 422 to the drain passage 425. Performing the air release cycle just prior to the backwash cycle prevents a pressurized air pocket from rushing into the drain passage 425 during this backwash cycle. During a rinse cycle, as shown in FIG. 4D, the valve actuator piston 430 is located in a position that allows water to flow from the supply water inlet passage 420 to the service water outlet passage 421 and to the first tank passage 422 and allows water to flow from the second tank passage 423 to the drain passage 425.

Figure 4D:
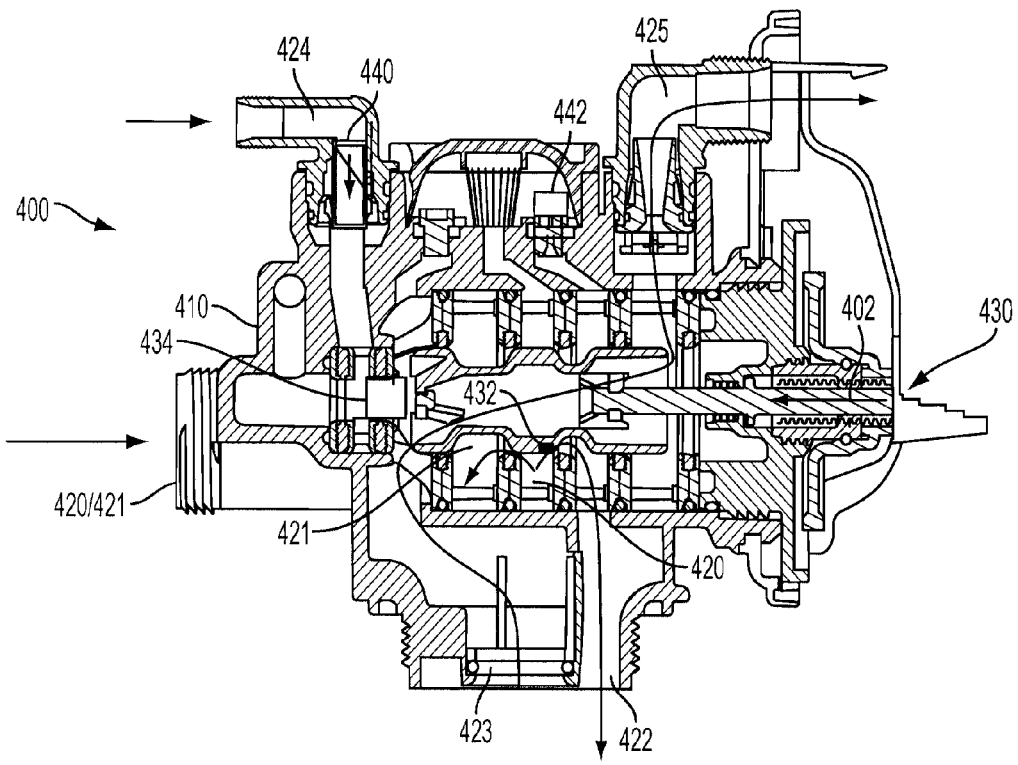

In the illustrated embodiment, the valve actuator piston 430 moves in the direction of arrow 402 sequentially from the service/air charge cycle position (FIG. 4A) to the air release cycle position (FIG. 4B) to the backwash cycle position (FIG. 4C) and then to the rinse cycle position (FIG. 4D). The direction of the valve actuator piston 430 may then be reversed to move back to the service/air charge cycle position (FIG. 4A). In one embodiment, a drive mechanism may be coupled to the valve actuator piston 430 to cause the piston to move to each of the cycle positions. The drive mechanism may include, for example, a drive wheel that rotates to cause linear movement of the piston 430 (e.g., using a lead screw to provide linear actuation), one or more gears engaging the drive wheel, and a motor for driving the gear(s).

Figure 5:
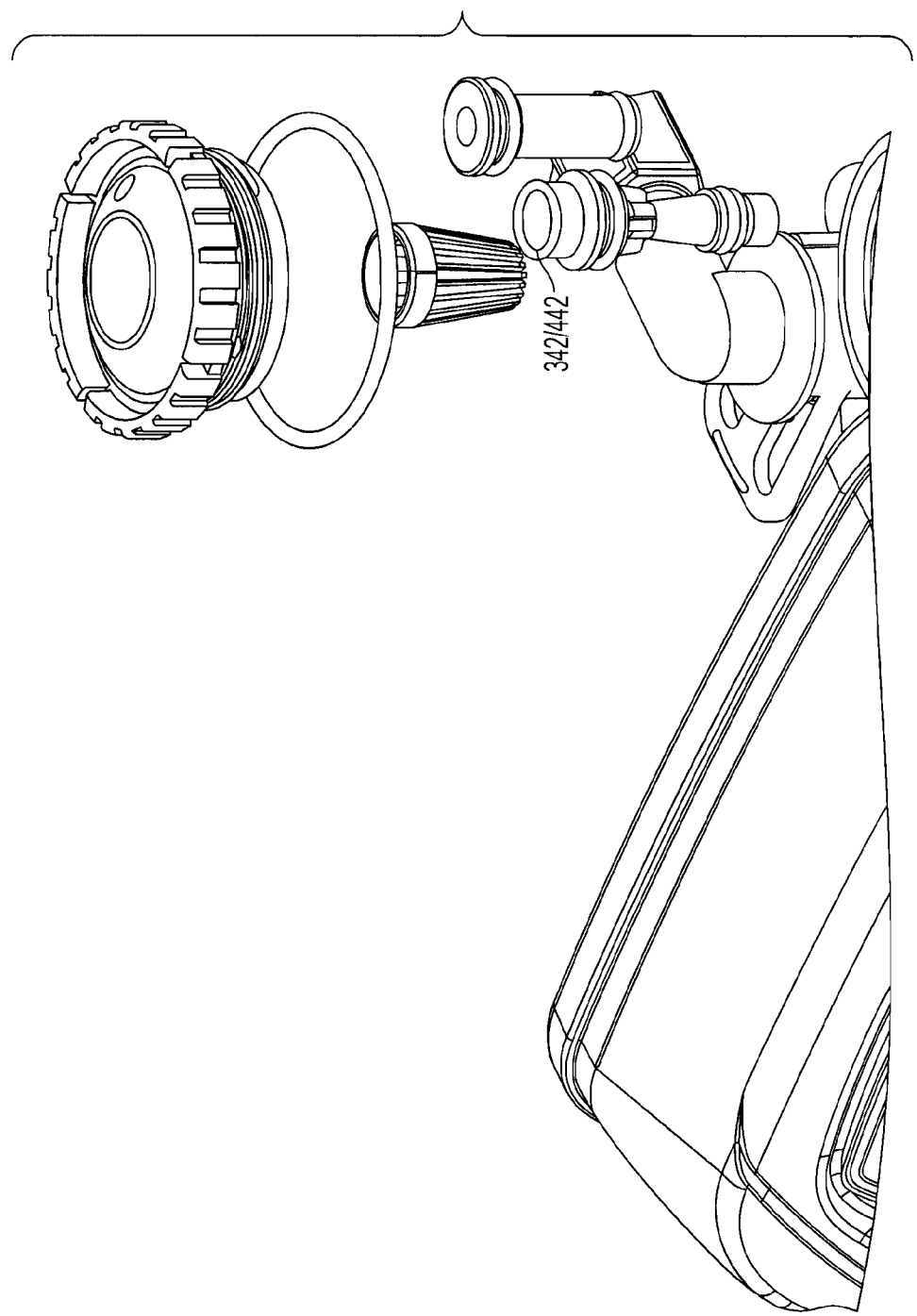
FIG. 5 is an exploded perspective view of a plugged injector assembly in the control valve shown in FIGS. 3A-3C or FIGS. 4A-4D.
Figure 6:
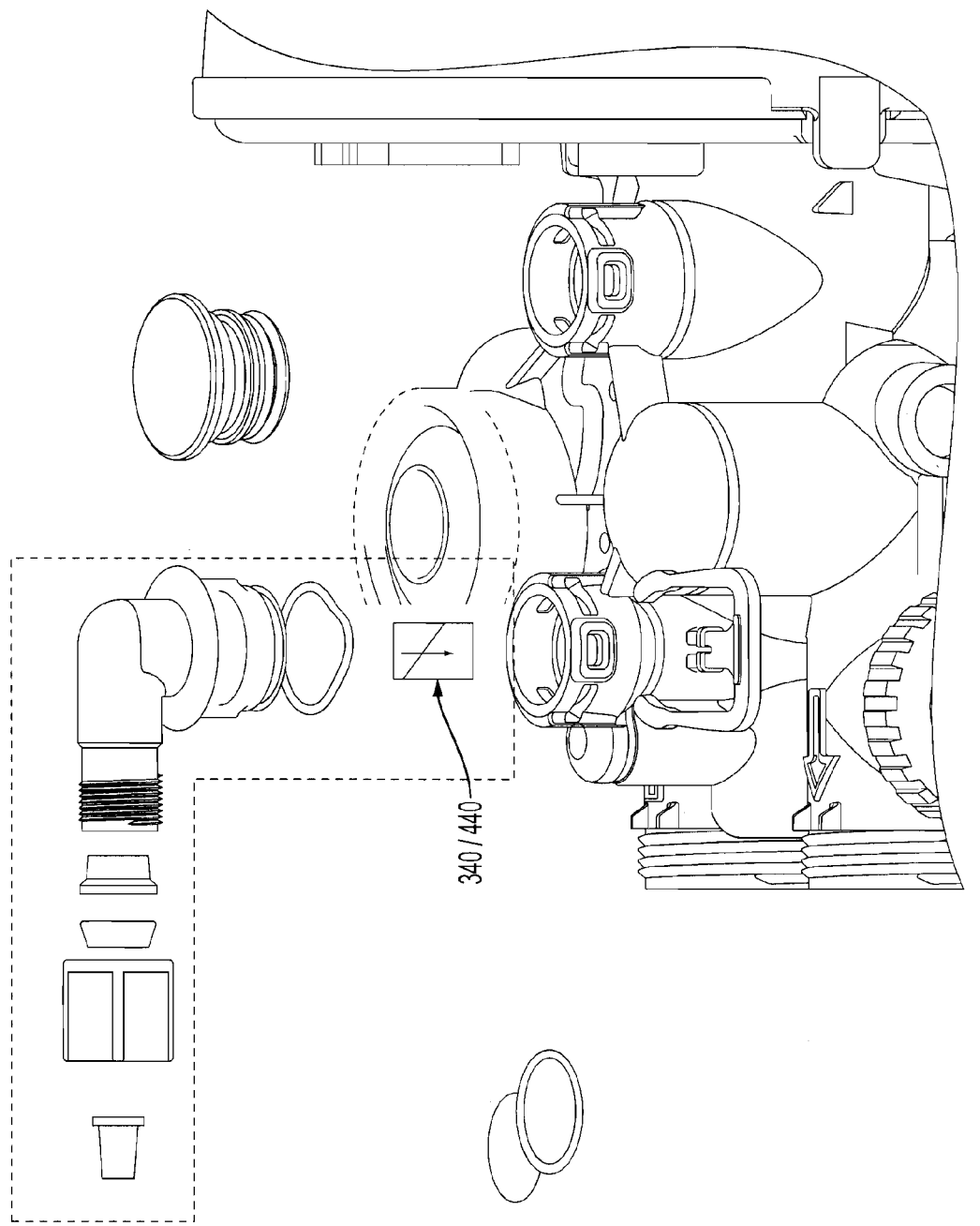
FIG. 6 is an exploded perspective view of an air inlet assembly of the control valve shown in FIGS. 3A-3C or FIGS. 4A-4D.
Figure 7:
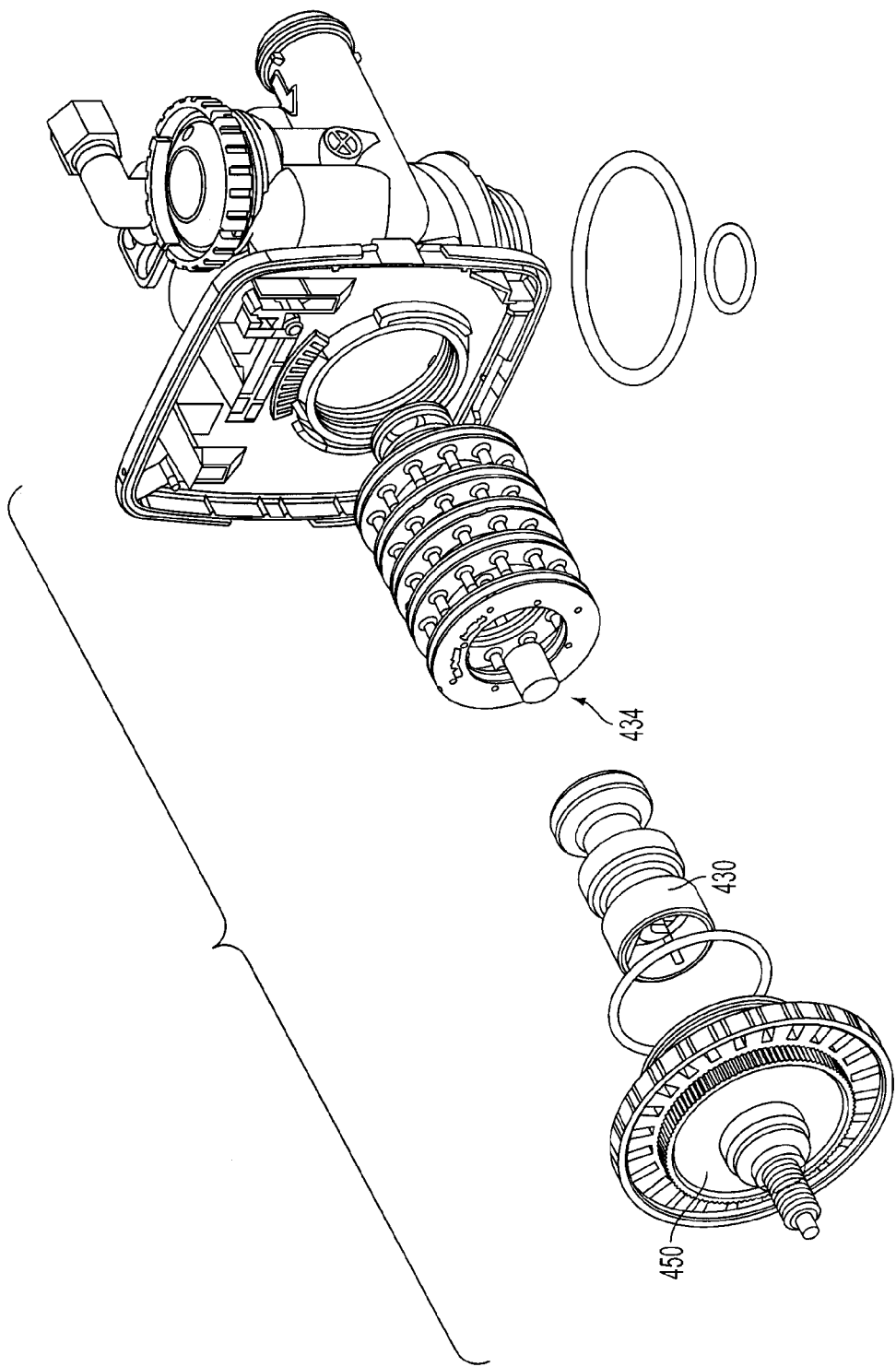
FIG. 7 is an exploded perspective view of a valve actuator assembly of the control valve shown in FIGS. 4A-4D.

FIGS. 5-7 illustrate in greater detail the modifications made to an exemplary WS series control valve from Clack Corporation to allow use with an air pump and to enable the operating cycles described above. FIG. 5 shows a plugged injector 342/442 in an injector assembly used in the embodiments of the control valves 300, 400 described above. FIG. 6 illustrates a check valve 340/440 in an air inlet assembly of the embodiments of the control valves 300, 400 described above. FIG. 7 illustrates a modified valve actuator piston 430 and piston plug 434 in a valve actuator assembly of the embodiment of the control valve 400 described above. In the illustrated embodiment, a drive wheel 450 is threadably engaged with a piston driving member to cause the valve actuator piston 430 to move linearly (e.g., to the different cycle positions) when the drive wheel 450 is rotated by a drive mechanism.

Accordingly, an aeration control valve, consistent with the embodiments herein, may facilitate aeration in a water treatment system without using a venturi injector to provide the aeration and without producing a rush of an air pocket during a backwash cycle.

Consistent with one embodiment, an aeration control valve system includes a valve assembly configured to be coupled to a water treatment tank. The valve assembly includes: a supply water inlet passage configured to receive water from a water supply; a service water outlet passage configured to direct water to a service water system; first and second tank passages configured to direct water in to or out of the water treatment tank; an air inlet passage configured to receive air; a drain outlet passage configured to direct water from the water treatment tank to a drain; and a valve cycle actuator configured to provide fluid connections between the passages based on different positions of the valve cycle actuator during different operation cycles. The aeration control valve system also includes an air pump coupled to the air passage inlet for pumping air through the air passage inlet.

Consistent with another embodiment, a water treatment system includes at least one water treatment tank and an aeration control valve system coupled to the water treatment tank for directing water and air in to and out of the water treatment tank during different operation cycles. The aeration control valve system includes an air pump for pumping the air into the treatment tank to aerate the water passing through the treatment tank without using water to draw air into the treatment tank.

Consistent with a further embodiment, a method is provided for operating a water treatment system. The method includes: treating the water in the water treatment system by directing water from a water supply to a water treatment tank, passing the water through an air charge to aerate the water, passing the aerated water through filter media in the water treatment tank to filter the aerated water, and directing treated water from the water treatment tank to a service water system;

backwashing the water treatment system by reversing a direction of water through the water treatment tank and directing backwashed water to a drain; and aerating the water treatment system by pumping air into the water treatment tank to provide the air charge.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. An aeration control valve system comprising:
    a valve assembly configured to be coupled to a water treatment tank, the valve assembly comprising:
        a supply water inlet passage configured to receive water from a water supply;
        a service water outlet passage configured to direct water to a service water system;
        first and second tank passages configured to direct water in to or out of the water treatment tank;
        an air inlet passage configured to receive air;
        a drain outlet passage configured to direct water from the water treatment tank to a drain; and
        a valve cycle actuator configured to provide fluid connections between the passages based on different positions of the valve cycle actuator during different operation cycles; and
    wherein the valve cycle actuator is configured, during an air release cycle, to provide a fluid connection between the supply water inlet passage and the first tank passage to allow water to be supplied to the water treatment tank, to provide a fluid connection between the second tank passage and the service water outlet passage to allow treated water to flow from the water treatment tank to the service water system, and to provide a fluid connection between the first tank passage and the drain outlet passage to allow air to release from the water treatment tank to the drain.

2. The aeration control valve system of claim 1 further comprising an air pump coupled to the air passage inlet for pumping air through the air passage inlet.

3. The aeration control valve system of claim 2 wherein the air pump is an atmospheric air pump capable of providing a pressure of 5 to 25 psi.

4. The aeration control valve system of claim 2 wherein the air pump is a high pressure air pump capable of providing a pressure of at least 25 psi.

5. The aeration control valve system of claim 1 wherein the valve cycle actuator includes at least a piston configured to block and open the passages selectively at different positions within the valve assembly.

6. The aeration control valve system of claim 1 wherein the valve cycle actuator is configured, during an air regeneration cycle, to provide a fluid connection between the air inlet passage and the first tank passage to allow air to be supplied into the water treatment tank via the first tank passage, to provide a fluid connection between the second tank passage and the drain outlet passage to allow water to be drained from the water treatment tank, and to provide a fluid connection between the supply water inlet passage and the service water outlet passage such that the water from the water supply is provided directly to the service water system.

7. The aeration control valve system of claim 6 wherein the valve cycle actuator is configured, during a backwash cycle, to provide a fluid connection between the supply water inlet passage and the second tank passage to allow water to flow back into the water treatment tank through the second tank passage and to provide a fluid connection between the first tank passage and the drain outlet passage to allow backwash water to flow from the treatment tank to the drain.

8. The aeration control valve system of claim 7 wherein the valve cycle actuator is configured, during a rinse cycle, to provide a fluid connection between the supply water inlet passage and the first tank passage to allow water to flow into the water treatment tank through the first tank passage and to provide a fluid connection between the second tank passage and the drain outlet passage to allow rinse water to flow from the treatment tank to the drain.

9. The aeration control valve system of claim 1 wherein the valve cycle actuator is configured, during an air charge/service cycle, to provide a fluid connection between the air inlet passage and the first tank passage to allow air to be supplied into the water treatment tank, to provide a fluid connection between the supply water inlet passage and the first tank passage to allow water to be supplied to the water treatment tank, and to provide a fluid connection between the second tank passage and the service water outlet passage to allow treated water to flow from the water treatment tank to the service water system.

10. The aeration control valve system of claim 1 wherein the valve cycle actuator includes at least a piston configured to block and open the passages selectively at different positions within the valve assembly, and wherein the piston includes a notch configured to allow the air to be released from the water treatment tank through the water supply passage to the drain.

11. A water treatment system comprising:
    at least one water treatment tank including a filter media for filtering water while in service and providing the aeration control valve system as disclosed in claim 1; and
    an aeration control valve system coupled to the water treatment tank for directing water and air in to and out of the water treatment tank during different operation cycles, the aeration control valve system being configured to release air from the water treatment tank during an air release cycle while in service and prior to a backwash cycle.

12. The water treatment system of claim 11 further comprising an atmospheric air pump capable of providing a pressure of 5 to 25 psi.

13. The water treatment system of claim 11 further comprising a high pressure air pump capable of providing a pressure of at least 25 psi.

14. A method of operating a water treatment system, the method comprising:
    treating the water in the water treatment system by directing water from a water supply to a water treatment tank, passing the water through an air charge to aerate the water, passing the aerated water through filter media in the water treatment tank to filter the aerated water, and directing treated water from the water treatment tank to a service water system;
    backwashing the water treatment system by reversing a direction of water through the water treatment tank and directing backwashed water to a drain;
    aerating the water treatment system by supplying air into the water treatment tank to provide the air charge; and
    releasing air from the water treatment system while the water treatment system is in service and before backwashing the water treatment system by directing air from the water treatment tank to the drain.

15. The method of claim 14 wherein aerating the water treatment system is performed while treating the water in the water treatment system.

16. The method of claim 14 wherein aerating the water treatment system is performed at a different time than treating the water in the water treatment system.

17. The method of claim 14 wherein the water treatment system is aerated by pumping air into the water treatment tank at a pressure of at least 25 psi.

18. The method of claim 14 wherein the water treatment system is aerated by pumping air into the water treatment tank at a pressure of 5 to 25 psi.

19. The method of claim 14 wherein the water treatment system is aerated without using water to draw air into the system.

20. A method of operating a water treatment system, the method comprising:
   treating the water in the water treatment system by providing the aeration control valve system as disclosed in claim 1, directing water from a water supply to a water treatment tank, passing the water through an air charge to aerate the water, filtering the aerated water through a filter media, and directing treated water from the water treatment tank to a service water system; and
   releasing air while the water treatment system is in service and introducing air into the water treatment tank prior to performing a backwash cycle.

21. The method of claim 20 further comprising performing a backwash cycle at a later time after at least one cycle of releasing air and introducing air, wherein the at least one cycle of releasing air and introducing air and the backwash cycle together form a single complete regeneration cycle.

22. The method of claim 20 further comprising performing multiple cycles of releasing air and introducing air without performing the backwash cycle.

23. The method of claim 20 wherein introducing air into the water treatment tank without performing a backwash cycle includes performing at least one service/air charge cycle.

24. The method of claim 23 further comprising performing multiple service/air charge cycles without performing the backwash cycle.

25. The method of claim 20, wherein releasing air and introducing air into the water treatment tank without performing a backwash cycle includes performing at least one air release cycle and at least one air charge cycle without performing a backwash cycle.

26. The method of claim 25 further comprising performing multiple air release cycles and air charge cycles without performing the backwash cycle.

27. The method of claim 25 further comprising performing a backwash cycle at a later time after the at least one air release cycle and the at least one air charge cycle, wherein the at least one air release cycle, the at least one air charge cycle and the backwash cycle together form a single complete regeneration cycle.

* * * * *